United States Patent
Ike et al.

(10) Patent No.: US 11,370,421 B2
(45) Date of Patent: Jun. 28, 2022

(54) COLLISION AVOIDANCE ASSISTANCE APPARATUS

(71) Applicant: TOYOTA JIDOSHA KABUSHIKI KAISHA, Toyota (JP)

(72) Inventors: Wataru Ike, Nagoya (JP); Yuma Hoshikawa, Nagoya (JP); Ryota Murakami, Toyota (JP); Yuto Shimbo, Toyota (JP)

(73) Assignee: TOYOTA JIDOSHA KABUSHIKI KATSHA, Toyota (JP)

( * ) Notice: Subject to any disclaimer, the term of this patent is extended or adjusted under 35 U.S.C. 154(b) by 132 days.

(21) Appl. No.: 17/004,481

(22) Filed: Aug. 27, 2020

(65) Prior Publication Data
US 2021/0061268 A1    Mar. 4, 2021

(30) Foreign Application Priority Data

Sep. 2, 2019 (JP) .............................. JP2019-159260

(51) Int. Cl.
*B60W 30/09* (2012.01)
*B60T 7/22* (2006.01)
(Continued)

(52) U.S. Cl.
CPC .............. *B60W 30/09* (2013.01); *B60T 7/22* (2013.01); *B60T 8/17558* (2013.01); *B60W 10/18* (2013.01); *B60W 30/0956* (2013.01); *G06V 20/58* (2022.01); *B60T 2201/022* (2013.01); *B60W 2540/106* (2013.01); *B60W 2554/4026* (2020.02); *B60W 2554/4029* (2020.02)

(58) Field of Classification Search
CPC .. B60T 2201/022; B60T 7/22; B60T 8/17558; B60W 10/06; B60W 10/18; B60W 2540/106; B60W 2554/402; B60W 2554/4026; B60W 2554/4029; B60W 30/09; B60W 30/0956; B60W 50/087; B60W 50/12; G06V 20/58
See application file for complete search history.

(56) References Cited

U.S. PATENT DOCUMENTS 5,646,612 A * 7/1997 Byon .................. B60T 7/22
                                                    340/901
11,014,554 B2 * 5/2021 Ito ..................... B60W 30/09
(Continued)

FOREIGN PATENT DOCUMENTS

JP    2010-137772 A    6/2010
JP    2012-121534 A    6/2012
(Continued)

*Primary Examiner* — Babar Sarwar
(74) *Attorney, Agent, or Firm* — Sughrue Mion, PLLC

(57) ABSTRACT

When a collision avoidance target is a pedestrian or a bicycle, a driving assistance ECU performs automatic braking control. In this case, accelerator override cannot be performed. When the collision avoidance target is an automobile and when an accelerator operation amount is equal to or larger than a first operation amount threshold, the driving assistance ECU prohibits the automatic braking control. In this case, the accelerator override can be performed. When the accelerator operation amount is smaller than the first operation amount threshold, the driving assistance ECU performs the automatic braking control.

4 Claims, 4 Drawing Sheets

(51) Int. Cl.
*B60T 8/1755* (2006.01)
*B60W 10/18* (2012.01)
*B60W 30/095* (2012.01)
*G06V 20/58* (2022.01)

(56) References Cited

U.S. PATENT DOCUMENTS

| | | | | |
|---|---|---|---|---|
| 2004/0145238 A1* | 7/2004 | Seto | .......................... | B60T 7/22 |
| | | | | 303/193 |
| 2005/0125153 A1* | 6/2005 | Matsumoto | ......... | B60T 8/17557 |
| | | | | 701/41 |
| 2005/0246086 A1* | 11/2005 | Motosugi | ................ | B60T 8/328 |
| | | | | 701/70 |
| 2012/0102941 A1* | 5/2012 | Yamada | ................ | B60T 8/4845 |
| | | | | 60/545 |
| 2012/0239266 A1* | 9/2012 | Kato | .......................... | B60T 7/22 |
| | | | | 701/70 |
| 2013/0041564 A1* | 2/2013 | Doi | ..................... | B60W 50/087 |
| | | | | 701/70 |
| 2013/0173113 A1* | 7/2013 | Takiguchi | ........... | B60W 50/087 |
| | | | | 701/36 |
| 2015/0046054 A1* | 2/2015 | Takahashi | ................. | B60T 8/58 |
| | | | | 701/70 |
| 2018/0151074 A1 | 5/2018 | Noto et al. | | |
| 2018/0215272 A1* | 8/2018 | Vitullo | ..................... | B60K 6/22 |
| 2019/0009775 A1* | 1/2019 | Ito | ........................ | B60W 30/085 |
| 2019/0337507 A1* | 11/2019 | Stein | ................ | B60W 50/0097 |
| 2021/0282639 A1* | 9/2021 | Yokoyama | .......... | G02B 27/0093 |

FOREIGN PATENT DOCUMENTS

| | | |
|---|---|---|
| JP | 2012-224119 A | 11/2012 |
| JP | 2013-129228 A | 7/2013 |
| JP | 2016-175572 A | 10/2016 |
| JP | 2016-218996 A | 12/2016 |
| JP | 2017-114430 A | 6/2017 |

\* cited by examiner

COLLISION AVOIDANCE ASSISTANCE APPARATUS

INCORPORATION BY REFERENCE

The disclosure of Japanese Patent Application No. 2019-159260 filed on Sep. 2, 2019 including the specification, drawings and abstract is incorporated herein by reference in its entirety.

BACKGROUND

1. Technical Field

The disclosure relates to a collision avoidance assistance apparatus configured to avoid collision between a driver's vehicle and an obstacle by performing automatic braking control.

2. Description of Related Art

There is known a collision avoidance assistance apparatus configured such that, when an obstacle having a strong possibility of collision with a driver's vehicle is detected by a front sensor such as a camera sensor or a radar sensor, the collision between the driver's vehicle and the obstacle is avoided by performing automatic braking control. The automatic braking control is control for decelerating the driver's vehicle at a predetermined deceleration by generating a braking force in the driver's vehicle without the need for a driver's braking operation.

While the automatic braking control is performed, the driver may depress an accelerator pedal. For example, Japanese Unexamined Patent Application Publication No. 2017-114430 (JP 2017-114430 A) proposes an apparatus configured to perform automatic braking control when a driver's vehicle is predicted to collide with an obstacle, but terminate the automatic braking control (that is, prohibit the automatic braking control) by giving priority to an accelerator operation of the driver when the accelerator operation amount of the driver is larger than a predetermined value. Thus, the driver's vehicle can be accelerated at an acceleration based on the accelerator operation. The operation of terminating the automatic braking control so that the driver's vehicle can be accelerated at the acceleration based on the accelerator operation is hereinafter referred to as accelerator override.

When a shift position changing operation is detected while the driver is performing the accelerator operation, the apparatus does not terminate the automatic braking control by presuming that the accelerator operation is a driver's erroneous operation. In this case, the accelerator override cannot be performed.

Japanese Unexamined Patent Application Publication No. 2012-121534 (JP 2012-121534 A) proposes an apparatus configured to determine whether a driver's operation is an appropriate collision avoidance operation or an erroneous operation, prohibit automatic braking control when determination is made that the driver's operation is an appropriate collision avoidance operation, and perform the automatic braking control when determination is made that the driver's operation is an erroneous operation. This apparatus performs the automatic braking control by determining that the driver's accelerator operation is an erroneous operation when a driver's vehicle is predicted to collide with an obstacle, when the accelerator operation amount is larger than a predetermined value, or when the accelerator operation speed is higher than a predetermined value.

SUMMARY

Each of the apparatuses described above does not terminate the automatic braking control (that is, performs the automatic braking control) when the driver's accelerator operation is presumed as an operation that is not intended by the driver (operation of erroneously depressing an accelerator pedal though the driver tries to depress a brake pedal). The driver's operation of erroneously depressing the accelerator pedal instead of the brake pedal may hereinafter be referred to as an erroneous depression.

However, it is difficult to accurately determine whether the driver's accelerator operation is an operation intended by the driver or the erroneous depression.

For example, the apparatus proposed in JP 2017-114430 A determines that an accelerator depressing operation along with a shift position changing operation is the erroneous depression. However, the driver may erroneously depress the accelerator pedal forcefully without the shift position changing operation. For example, in a situation in which the driver's vehicle is approaching a pedestrian, the driver does not generally depress the accelerator pedal forcefully. For example, in a case where the driver is perturbed about his/her late awareness of a pedestrian, the driver may erroneously depress the accelerator pedal forcefully though he/she tries to depress the brake pedal. In this case, determination is not made that the accelerator depressing operation is the erroneous depression because the shift position changing operation is not performed. Therefore, the automatic braking control is not performed even in a situation in which the automatic braking control is supposed to be performed to avoid collision.

For example, the apparatus proposed in JP 2012-121534 A determines that the accelerator operation is the erroneous depression when the accelerator operation amount is larger than the predetermined value or when the accelerator operation speed is higher than the predetermined value. When the driver intends to depress the accelerator pedal forcefully or quickly, however, determination is made that the driver's accelerator operation is the erroneous depression. Therefore, the automatic braking control is performed. For example, when the driver accelerates a driver's vehicle C1 so as to pass a preceding vehicle C2 traveling ahead of the driver's vehicle C1 as illustrated in FIG. 6, determination is made that the preceding vehicle C2 is an obstacle because the driver's vehicle C1 suddenly approaches the preceding vehicle C2 in the process of passing the preceding vehicle C2. Therefore, the automatic braking control may be performed. When the automatic braking control is started, the accelerator override cannot be performed, and therefore the driver's vehicle cannot travel along a path desired by the driver. Further, a succeeding vehicle may excessively approach the driver's vehicle due to the automatic braking control.

The disclosure provides a technique to perform automatic braking control in an appropriate situation.

A collision avoidance assistance apparatus according to an aspect of the disclosure includes a braking device configured to generate a braking force in a driver's vehicle in response to a braking operation of a driver;

an obstacle detector configured to detect an obstacle around the driver's vehicle; and a controller configured to:
(i) perform, when determination is made that the driver's vehicle has a strong possibility of colliding with the obstacle, automatic braking control for avoiding collision between the driver's vehicle and the obstacle by generating the braking force with the braking device without the braking operation of the driver;
(ii) prohibit the automatic braking control when determination is made that an accelerator operation index value is equal to or larger than an operation threshold, the accelerator operation index value having a correlation with an accelerator operation of the driver;
(iii) determine whether a type of the obstacle is a specific type set in advance; and
(iv) avoid prohibiting the automatic braking control when determination is made that the type of the obstacle is the specific type.

The braking device generates the braking force (for example, a braking torque for stopping rotation of wheels) in the driver's vehicle in response to the braking operation of the driver. For example, the braking device may generate the braking force with a braking hydraulic pressure in response to the braking operation.

The obstacle detector detects an obstacle around the driver's vehicle.

When determination is made that the driver's vehicle has a strong possibility of colliding with the obstacle, the controller performs the automatic braking control for avoiding collision between the driver's vehicle and the obstacle by generating the braking force with the braking device without the braking operation of the driver.

The controller prohibits the automatic braking control when determination is made that the accelerator operation index value having a correlation with the accelerator operation of the driver is equal to or larger than the operation threshold. For example, the accelerator operation index value may be at least one of an accelerator operation amount and an accelerator operation speed. The automatic braking control is terminated when the controller prohibits the automatic braking control while the automatic braking control is performed. The start of the automatic braking control is prohibited in a situation in which the automatic braking control is not performed.

For example, when the driver intends to perform a forceful accelerator operation so as to avoid the obstacle, the automatic braking control is not performed, and the driver can avoid collision while accelerating the driver's vehicle as intended by the driver through accelerator override.

The accelerator operation is not always performed as intended by the driver. For example, in a situation in which the driver's vehicle is approaching a pedestrian, a bicycle rider, or other vulnerable persons in traffic, the driver does not generally perform a forceful accelerator operation. When a forceful accelerator operation is detected in this situation, the accelerator override may be prohibited on the presumption that the driver performs an erroneous depression.

The controller determines whether the type of the obstacle is the specific type set in advance. When determination is made that the type of the obstacle is the specific type, the controller does not prohibit the automatic braking control. Thus, it is not prohibited from performing the automatic braking control.

According to the disclosure, determination is made whether to prohibit the automatic braking control depending on the type of the obstacle. Thus, the automatic braking control can be performed in an appropriate situation.

The controller may be configured to (i) recognize at least a pedestrian, a bicycle, and an automobile as target obstacles for the automatic braking control, and (ii) determine that at least the pedestrian and the bicycle are obstacles of the specific type, and determine that at least the automobile is not an obstacle of the specific type.

According to this configuration, the controller recognizes at least the pedestrian, the bicycle, and the automobile as the target obstacles for the automatic braking control.

In a situation in which the driver's vehicle is approaching the pedestrian or the bicycle, the driver does not generally perform a forceful accelerator operation. In a situation in which the driver's vehicle is approaching a different vehicle, the driver may intend to perform a forceful accelerator operation. For example, the driver may accelerate the driver's vehicle so as to pass a preceding vehicle traveling ahead of the driver's vehicle. In this case, determination may be made that the preceding vehicle is an obstacle because the driver's vehicle suddenly approaches the preceding vehicle in the process of passing the preceding vehicle. Therefore, the automatic braking control may be started. In this case, a succeeding vehicle may excessively approach the driver's vehicle due to the automatic braking control.

The controller determines that at least the pedestrian and the bicycle are obstacles of the specific type, and determines that at least the automobile is not an obstacle of the specific type. In this case, the "bicycle" may be a bicycle that a person is riding, and a bicycle left on a road (bicycle that no person is riding) need not be an obstacle of the collision avoidance target.

When the obstacle is the pedestrian or the bicycle, the automatic braking control is not prohibited. That is, the automatic braking control is permitted. Thus, when the driver's vehicle has a strong possibility of colliding with the pedestrian or the bicycle but the driver erroneously depresses the accelerator pedal forcefully, the accelerator operation is ignored and the automatic braking control is performed. Thus, the collision avoidance can be assisted satisfactorily.

When the obstacle is the automobile, the controller determines that the obstacle is not an obstacle of the specific type. Therefore, the automatic braking control is prohibited when the accelerator operation index value is equal to or larger than the operation threshold. Thus, the accelerator override can be performed, and the driver can avoid collision through his/her operation.

The accelerator operation may be an operation for an accelerator pedal of the driver's vehicle. The controller may nay be configured to determine whether a second-time depression of the accelerator pedal is performed during the automatic braking control, and terminate the automatic braking control when it is determined that the second-time depression of the accelerator pedal is performed during the automatic braking control.

When the driver performs the second-time depression of the accelerator pedal (operation of releasing a foot from the depressed accelerator pedal and then depressing the accelerator pedal again) during the automatic braking control, this operation can be presumed as an operation intended by the driver to accelerate the driver's vehicle. In this case, the accelerator override may be performed.

The controller may determine whether the second-time depression of the accelerator pedal is performed during the automatic braking control. The controller may terminate the automatic braking control when it is determined that the second-time depression of the accelerator pedal is performed during the automatic braking control.

According to this configuration, the automatic braking control can be prohibited in a situation in which the driver tries to accelerate the driver's vehicle.

The accelerator operation may be an operation for an accelerator pedal of the driver's vehicle. The controller may be configured to (i) acquire an accelerator pedal operation amount and an accelerator pedal operation speed of the driver as the accelerator operation index value, and (ii) determine that the accelerator operation index value is equal to or larger than the operation threshold when at least one of the following conditions is satisfied. A first condition is that the accelerator pedal operation amount is equal to or larger than a first operation amount threshold. A second condition is that the accelerator pedal operation amount is equal to or larger than a second operation amount threshold smaller than the first operation amount threshold and the accelerator pedal operation speed is equal to or higher than an operation speed threshold.

According to this configuration, the accelerator pedal operation condition for prohibition of the automatic braking control can be set appropriately. Therefore, it is possible to reduce the occurrence of a case where the automatic braking control is performed due to an accelerator pedal operation intended by the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A collision avoidance assistance apparatus according to an embodiment of the disclosure is described below with reference to the drawings.

Figure 1:
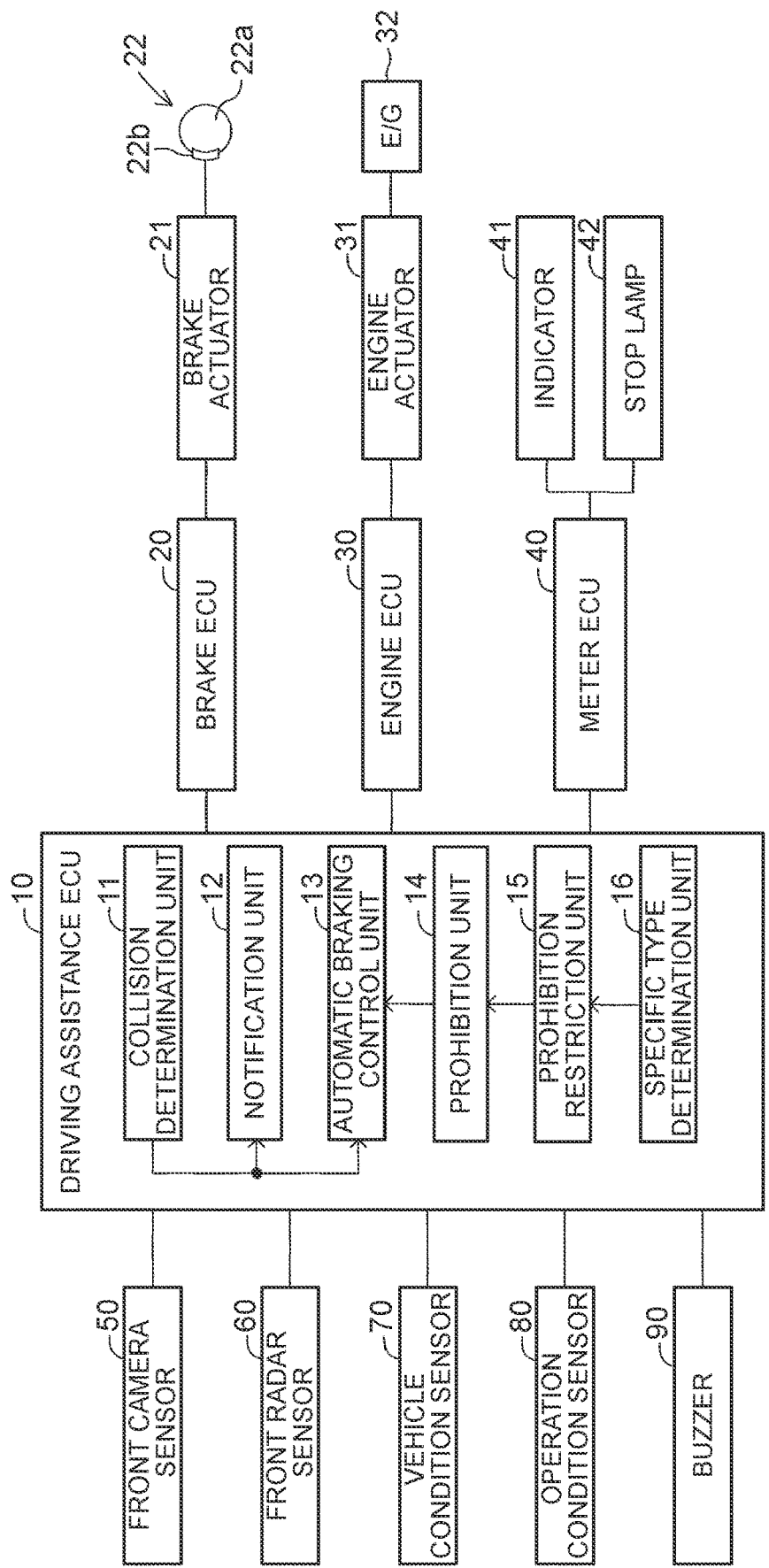
FIG. 1 is a schematic configuration diagram of a collision avoidance assistance apparatus according to an embodiment of the disclosure.

The collision avoidance assistance apparatus according to the embodiment of the disclosure is applied to a vehicle (hereinafter referred to as "driver's vehicle" for distinction from other vehicles), and includes a driving assistance electric control unit (ECU) 10, a brake ECU 20, an engine ECU 30, and a meter ECU 40 as illustrated in FIG. 1.

Those ECUs are electric control units each including a microcomputer as a main part, and are connected together via a controller area network (CAN) (not illustrated) so that information is transmissible to and receivable from one another. The microcomputer herein includes a central processing unit (CPU), a read-only memory (ROM), a random-access memory (RAM), a non-volatile memory, and an interface (I/F). The CPU implements various functions by executing instructions (programs or routines) stored in the ROM. The ECUs may partially or entirely be integrated into a single ECU.

The driving assistance ECU 10 is a central controller that performs driving assistance for a driver, and performs collision avoidance assistance control. The collision avoidance assistance control is intended to arouse driver's attention when an obstacle is detected ahead of the driver's vehicle, and avoid collision between the driver's vehicle and the obstacle through automatic braking control when the possibility of collision further increases. The collision avoidance assistance control is generally called pre-crash safety (PCS) control, and therefore the collision avoidance assistance control is hereinafter referred to as PCS control.

The driving assistance ECU 10 is connected to a front camera sensor 50, a front radar sensor 60, a vehicle condition sensor 70, an operation condition sensor 80, and a buzzer 90.

The front camera sensor 50 is provided at an upper part of a windshield in a vehicle cabin, and photographs a scene ahead of the driver's vehicle. The front camera sensor 50 recognizes lane marking lines on a road and a three-dimensional object ahead of the driver's vehicle based on an image of the photographed scene, and supplies information on those lines and object (lane marking line information and three-dimensional object information) to the driving assistance ECU 10 in every predetermined period. For example, the lane marking line information indicates the shapes of the lane marking lines and a relative positional relationship between the driver's vehicle and the lane marking lines. For example, the three-dimensional object information indicates the type of the detected three-dimensional object ahead of the driver's vehicle, the size of the three-dimensional object, and a relative positional relationship between the three-dimensional object and the driver's vehicle. For example, the recognition of the type of the three-dimensional object is implemented by machine learning such as pattern matching.

The front radar sensor 60 is provided at the center of a front side of a vehicle body, and detects a three-dimensional object in an area ahead of the driver's vehicle. The front radar sensor 60 radiates radio waves in a millimeter waveband (hereinafter referred to as "millimeter waves"), and receives millimeter waves reflected by a three-dimensional object within a radiation range (for example, a different vehicle, a pedestrian, a bicycle, or a building) (that is, reflected waves). Based on a phase difference between the transmitted millimeter waves and the received reflected waves, an attenuation level of the reflected waves, and a time from the transmission of the millimeter waves to the reception of the reflected waves, the front radar sensor 60 calculates a distance between the driver's vehicle and the three-dimensional object, a relative speed between the driver's vehicle and the three-dimensional object, and a relative position (direction) of the three-dimensional object to the driver's vehicle. The front radar sensor 60 supplies information indicating calculation results (three-dimensional object information) to the driving assistance ECU 10 in every predetermined period.

The driving assistance ECU 10 acquires highly accurate three-dimensional object information by combining the three-dimensional object information supplied from the front camera sensor 50 and the three-dimensional object information supplied from the front radar sensor 60.

The front camera sensor 50 and the front radar sensor 60 are hereinafter referred to collectively as a front sensor, and information on the area ahead of the driver's vehicle from the front camera sensor 50 and the front radar sensor 60 is hereinafter referred to as front sensor information.

Examples of the vehicle condition sensor 70 include a vehicle speed sensor configured to detect a traveling speed of the vehicle, a longitudinal acceleration sensor configured to detect an acceleration in a longitudinal direction of the vehicle, a lateral acceleration sensor configured to detect an acceleration in a lateral direction of the vehicle, and a yaw rate sensor configured to detect a yaw rate of the vehicle.

The operation condition sensor 80 is a sensor or switch configured to detect a driver's operation. Examples of the operation condition sensor 80 include an accelerator operation amount sensor configured to detect an operation amount of an accelerator pedal, a brake operation amount sensor configured to detect an operation amount of a brake pedal, a brake switch configured to detect whether the brake pedal is operated, a steering angle sensor configured to detect a steering angle, a steering torque sensor configured to detect a steering torque, and a shift position sensor configured to detect a shift position of a transmission.

Information detected by the vehicle condition sensor 70 and the operation condition sensor 80 (referred to as sensor information) is supplied to the driving assistance ECU 10 via the CAN (not illustrated) in every predetermined period.

The buzzer 90 sounds in response to a command from the driving assistance ECU 10. To arouse driver's attention, the driving assistance ECU 10 causes the buzzer 90 to sound by transmitting a sounding command to the buzzer 90. Thus, the driver's attention can be aroused.

The brake ECU 20 is connected to a brake actuator 21. The brake actuator 21 is provided in a hydraulic circuit between a master cylinder (not illustrated) and a friction brake mechanism 22. The master cylinder pressurizes hydraulic oil with a depression force of the brake pedal. The friction brake mechanism 22 is provided in each of front and rear wheels on the right and left. The friction brake mechanism 22 includes a brake disc 22a fixed to the wheel, and a brake caliper 22b fixed to the vehicle body. The brake actuator 21 adjusts a hydraulic pressure to be supplied to a wheel cylinder in the brake caliper 22b in response to a command from the brake ECU 20, and actuates the wheel cylinder with the hydraulic pressure to press brake pads against the brake disc 22a, thereby generating a frictional braking force. The brake ECU 20 sets a driver's request deceleration based on an operation amount of the brake pedal that is detected by the brake operation amount sensor, and controls actuation of the brake actuator 21 so that the driver's vehicle is decelerated at the driver's request deceleration. When a PCS brake command is received from the driving assistance ECU 10, the brake ECU 20 controls actuation of the brake actuator 21 so that the driver's vehicle is decelerated at a PCS request deceleration, which is information contained in the PCS brake command.

When the PCS brake command is received and the brake pedal is operated, the brake ECU 20 employs, as a final request deceleration, a request deceleration whose absolute value is larger out of the driver's request deceleration and the PCS request deceleration. The brake ECU 20 controls actuation of the brake actuator 21 so that the driver's vehicle is decelerated at the final request deceleration. That is, the brake ECU 20 executes brake override.

The engine ECU 30 is connected to an engine actuator 31. The engine actuator 31 changes an operating condition of an engine 32 (internal combustion engine). Examples of the engine actuator 31 include a throttle valve actuator configured to change the opening degree of a throttle valve. The engine ECU 30 sets a driver's request torque based on an accelerator pedal operation amount detected by the accelerator operation amount sensor and a vehicle speed detected by the vehicle speed sensor, and controls actuation of the engine actuator 31 so that the engine 32 outputs the driver's request torque. When a driving force limiting command is received from the driving assistance ECU 10, the engine ECU 30 controls actuation of the engine actuator 31 so as to limit an output torque of the engine 32. If the vehicle is an electric vehicle, the engine actuator 31 corresponds to a driver for an electric motor. If the vehicle is a hybrid vehicle, the engine actuator 31 corresponds to an engine actuator and a driver for an electric motor.

The meter ECU 40 is connected to an indicator 41 and a stop lamp 42. The meter ECU 40 can cause the indicator 41 to display an indication related to driving assistance in response to a command from the driving assistance ECU 10. The meter ECU 40 can turn ON the stop lamp 42 in response to a command from the driving assistance ECU 10 or the brake ECU 20.

PCS Control

Next, the PCS control is described. Focusing on functions, the driving assistance ECU 10 includes a collision determination unit 11, a notification unit 12, an automatic braking control unit 13, a prohibition unit 14, a prohibition restriction unit 15, and a specific type determination unit 16.

The collision determination unit 11 determines whether the driver's vehicle may collide with a three-dimensional object ahead of the driver's vehicle based on front sensor information supplied from the front sensor and a vehicle condition detected by the vehicle condition sensor 70. For example, the collision determination unit 11 determines whether the driver's vehicle has a strong possibility of colliding with the three-dimensional object when the three-dimensional object keeps a current moving state (stopped state if the three-dimensional object is a stationary object) and the driver's vehicle keeps a current traveling state. When the collision determination unit 11 determines that the driver's vehicle has a strong possibility of colliding with the three-dimensional object based on the determination result, the collision determination unit 11 recognizes the three-dimensional object as an obstacle.

Only when the type of the three-dimensional object is a pedestrian, a bicycle, or an automobile, the collision determination unit 11 sets the three-dimensional object as a collision avoidance target (target for automatic braking control). The "bicycle" is a bicycle that a person is riding, and does not include a bicycle left on a road (bicycle that no person is riding). Thus, the front camera sensor 50 only needs to detect at least a pedestrian, a bicycle, and an automobile among three-dimensional objects ahead of the driver's vehicle so that the types are identifiable.

The collision determination unit 11 determines whether the driver's vehicle has a strong possibility of colliding with the three types of object (pedestrian, bicycle, and automobile), and recognizes those objects as obstacles when the possibility of collision is strong. The collision determination unit 11 does not set the collision avoidance target to three-dimensional objects different from the three types of object, and does not therefore recognize those three-dimensional objects as obstacles. The pedestrian, the bicycle, and the automobile are hereinafter referred to as collision avoidance targets.

More specifically, when an obstacle is detected, the collision determination unit 11 calculates a collision prediction time TTC that may elapse until the driver's vehicle collides with the obstacle. The collision prediction time TTC is calculated from Expression (1) based on a distance "d"

between the obstacle and the driver's vehicle and a relative speed Vr of the driver's vehicle to the obstacle.

$$TTC=d/Vr \quad (1)$$

The collision prediction time TTC is used as an index indicating the level of the possibility of collision between the driver's vehicle and the obstacle. As the value of the collision prediction time TTC decreases, the possibility (risk) of collision between the driver's vehicle and the obstacle increases.

In the PCS control of this embodiment, the level of the possibility of collision between the driver's vehicle and the obstacle is divided into two stages based on the collision prediction time TTC. In an early stage, that is, in a first stage, the notification unit 12 warns the driver by using the buzzer 90 and the indicator 41. In a second stage higher than the first stage in terms of the level of the possibility of collision between the driver's vehicle and the obstacle, the automatic braking control unit 13 performs automatic braking control to assist collision avoidance.

The collision determination unit 11 determines that the level of the possibility of collision between the driver's vehicle and the obstacle reaches the first stage when the collision prediction time TTC decreases to a warning threshold TTCw or shorter. The collision determination unit 11 determines that the level of the possibility of collision between the driver's vehicle and the obstacle reaches the second stage when the collision prediction time TTC further decreases to an actuation threshold TTCa (<TTCw) or shorter. It is appropriate that, when determination is made that the level of the possibility of collision of the driver's vehicle reaches the first stage for any detected three-dimensional object, the notification unit 12 actuate the buzzer 90 and the indicator 41 irrespective of whether the three-dimensional object is the collision avoidance target.

When determination is made that the level of the possibility of collision between the driver's vehicle and the obstacle (collision avoidance target) reaches the second stage, the automatic braking control unit 13 transmits a PCS brake command to the brake ECU 20. The PCS brake command contains information indicating a PCS request deceleration Gpcs.

The PCS request deceleration Gpcs can be calculated as follows. For example, if an obstacle is stopped, a traveling distance X required to stop the driver's vehicle can be represented by Expression (2) when a current speed of the driver's vehicle (=relative speed) is represented by "V", a deceleration of the driver's vehicle is represented by "a" (<0), and a time required to stop the vehicle is represented by "t".

$$X=V \cdot t+(1/2)\cdot a \cdot t^2 \quad (2)$$

The time "t" required to stop the vehicle can be represented by Expression (3).

$$t=-V/a \quad (3)$$

Thus, the traveling distance X required to stop the driver's vehicle can be represented by Expression (4) by substituting the time "t" calculated from Expression (3) into the time "t" of Expression (2).

$$X=-V^2/2a \quad (4)$$

To stop the vehicle at a distance β back from the obstacle, it is appropriate that the deceleration "a" be calculated by setting the traveling distance X to a distance (d−β) obtained by subtracting the distance β(>0) from the distance "d" detected by the front sensor. If the obstacle is moving, it is appropriate that the traveling distance X be calculated by using a speed and a deceleration relative to the obstacle.

The calculated deceleration "a" is employed as the PCS request deceleration Gpcs. An upper limit value Gmax (>0) is set to the PCS request deceleration Gpcs, and the value (absolute value) of the PCS request deceleration Gpcs is set to the upper limit value Gmax when the value of the calculated PCS request deceleration Gpcs exceeds the upper limit value Gmax.

When the PCS brake command is received, the brake ECU 20 controls the brake actuator 21 so that the PCS request deceleration Gpcs is obtained. Thus, the driver's vehicle can forcibly be decelerated by generating frictional braking forces in the front and rear wheels on the right and left without the need for the driver's operation for the brake pedal.

Thus, the automatic braking control is control for decelerating the driver's vehicle by generating frictional braking forces in the front and rear wheels on the right and left in response to the PCS brake command.

The automatic braking control unit 13 determines whether the collision prediction time TTC is longer than a termination threshold TTCb (set larger than the actuation threshold TTCa) (TTC>TTCb) through the automatic braking control. That is, the automatic braking control unit 13 monitors whether the possibility of collision between the driver's vehicle and the obstacle decreases (whether collision is avoided successfully). The automatic braking control unit 13 terminates the transmission of the PCS brake command when determination is made that the possibility of collision between the driver's vehicle and the obstacle decreases. Thus, the automatic braking control is terminated, and the PCS control is terminated simultaneously. The termination threshold TTCb is set larger than the actuation threshold TTCa.

Alternatively, the automatic braking control unit 13 terminates the transmission of the PCS brake command when the driver's vehicle is stopped through the automatic braking control. Thus, the automatic braking control is terminated. The automatic braking control unit 13 transmits a stop keeping command to the brake ECU 20 for a predetermined time (for example, 2 seconds) after the automatic braking control is terminated. While the stop keeping command is received, the brake ECU 20 controls the brake actuator 21 to supply a hydraulic pressure set for keeping the stop to the wheel cylinders of the friction brake mechanisms 22 of the front and rear wheels on the right and left. Thus, the stopped state of the driver's vehicle is kept for the predetermined time. The PCS control is terminated after the stopped state of the driver's vehicle is kept for the predetermined time. The brake ECU 20 transmits a turn ON command for the stop lamp 42 to the meter ECU 40 while the automatic braking control is performed and while the driver's vehicle is kept in the stopped state.

The automatic braking control unit 13 transmits a driving force limiting command for limiting an engine output torque (for example, setting the engine output torque to zero) to the engine ECU 30 while the automatic braking control is performed and while the driver's vehicle is kept in the stopped state. Even if the driver operates the accelerator pedal while the automatic braking control is performed, the driver's request torque is ignored, and therefore the driver's vehicle is not accelerated in response to the accelerator pedal operation.

The driver may recognize an obstacle and try to avoid collision through his/her accelerator operation. If the automatic braking control is performed in this case, the driver's request torque is ignored, and the accelerator override cannot be performed. Therefore, the driver's vehicle cannot travel along a path intended by the driver. If the driver's vehicle abnormally approaches an obstacle because the driver erroneously depresses the accelerator pedal, it is necessary to prohibit the accelerator override and perform the automatic braking control.

The driving assistance ECU 10 includes the prohibition unit 14, the prohibition restriction unit 15, and the specific type determination unit 16 in order to perform appropriate accelerator override, that is, appropriately restrict the automatic braking control depending on situations.

The prohibition unit 14 determines whether an accelerator operation amount AP is equal to or larger than a first operation amount threshold AP1. When determination is made that the accelerator operation amount AP is equal to or larger than the first operation amount threshold AP1, the prohibition unit 14 prohibits the automatic braking control unit 13 from performing the automatic braking control. The automatic braking control unit 13 does not start the automatic braking control when the automatic braking control is prohibited before the automatic braking control is performed (that is, AP is equal to or larger than AP1). The automatic braking control unit 13 terminates the automatic braking control when the automatic braking control is prohibited while the automatic braking control is performed (that is, AP increases to AP1 or larger).

Figure 6:
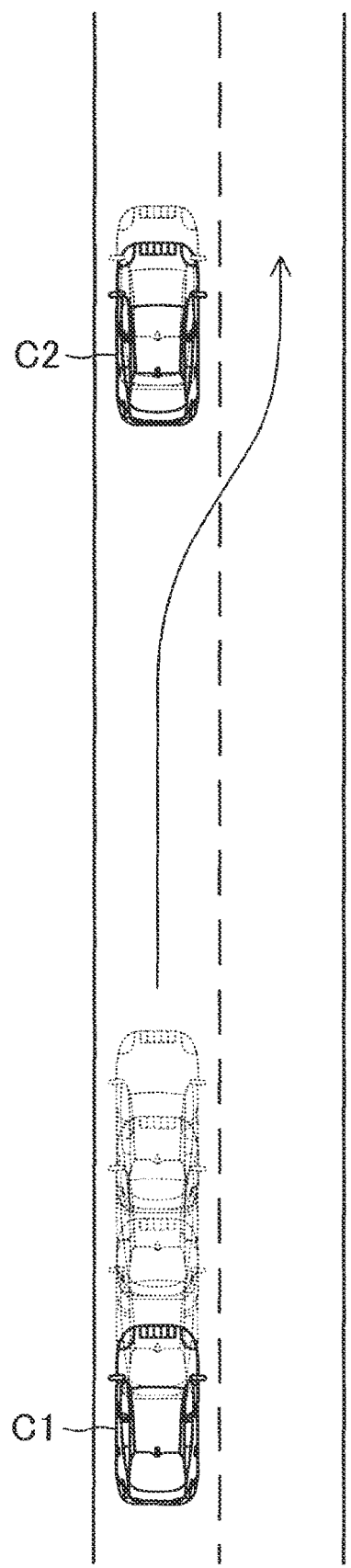
FIG. 6 is a plan illustrating a situation in which a driver's vehicle is going to approach and pass a preceding vehicle.

For example, when the driver forcefully depresses the accelerator pedal so as to pass a preceding vehicle C2 as illustrated in FIG. 6, the automatic braking control is not performed even if a driver's vehicle C1 suddenly approaches the preceding vehicle C2. Therefore, the driver's vehicle C1 can travel along a path intended by the driver.

In a situation in which the driver's vehicle is approaching a pedestrian or a bicycle, the driver does not generally perform a forceful accelerator operation. When a large accelerator operation amount is detected in this situation, the accelerator operation can be presumed as an erroneous depression.

The specific type determination unit 16 determines whether a detected obstacle is "any one of a pedestrian and a bicycle (bicycle that a person is riding)" or an automobile. When the specific type determination unit 16 determines that the detected obstacle is "any one of a pedestrian and a bicycle", the prohibition restriction unit 15 restricts an operation of the prohibition unit 14. Thus, the automatic braking control unit 13 is not prohibited from performing the automatic braking control. Accordingly, when the obstacle is "any one of a pedestrian and a bicycle", the automatic braking control unit 13 performs the automatic braking control irrespective of the value of the accelerator operation amount AP. As a result, the accelerator override is not permitted.

In other words, when the specific type determination unit 16 determines that "the detected obstacle is an automobile", the prohibition restriction unit 15 does not restrict the operation of the prohibition unit 14. Thus, the prohibition unit 14 prohibits the automatic braking control unit 13 from performing the automatic braking control when determination is made that the accelerator operation amount AP is equal to or larger than the first operation amount threshold AP1 as described above. As a result, the accelerator override is permitted.

Automatic Braking Permission/Prohibition Switching Control Routine

Figure 2:
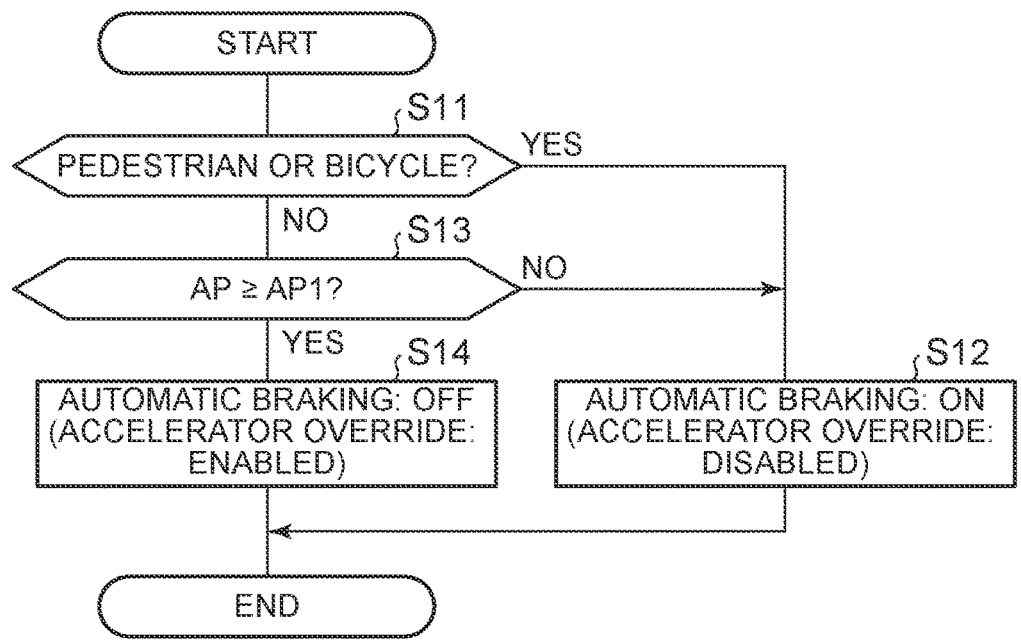
FIG. 2 is a flowchart illustrating an automatic braking permission/prohibition switching control routine.

Next, detailed description is given of an automatic braking permission/prohibition switching process to be performed by the driving assistance ECU 10 (functional units corresponding to the prohibition unit 14, the prohibition restriction unit 15, and the specific type determination unit 16). FIG. 2 illustrates an automatic braking permission/prohibition switching control routine to be performed by the driving assistance ECU 10. The driving assistance ECU 10 repeats the automatic braking permission/prohibition switching control routine in every predetermined calculation period. The automatic braking permission/prohibition switching control routine is hereinafter referred to simply as a switching control routine.

The switching control routine is executed in a period (execution period) from a timing when the following execution start condition is satisfied to a timing when the following execution end condition is satisfied.

Execution start condition: The execution start condition is satisfied when determination is made that the driver's vehicle has a strong possibility of colliding with an obstacle (that is, the collision prediction time TTC reaches the actuation threshold TTCa or shorter). When the prohibition unit 14 prohibits the automatic braking control (see S14) as described later, the execution start condition is not satisfied until the collision prediction time TTC reaches the actuation threshold TTCa or shorter for an obstacle different from the obstacle during the prohibition.

Execution end condition: The execution end condition is satisfied at an earlier timing out of a timing when determination is made that collision between the driver's vehicle and an obstacle is avoided (that is, the collision prediction time TTC is longer than the termination threshold TTCb) and a timing when determination is made that the driver's vehicle is stopped.

When the switching control routine is started, the driving assistance ECU 10 determines in Step S11 whether the collision avoidance target is "any one of a pedestrian and a bicycle (bicycle that a person is riding)". When the collision avoidance target is "any one of a pedestrian and a bicycle" (S11: Yes), the driving assistance ECU 10 advances the process to Step S12 to perform the automatic braking control. That is, the prohibition restriction unit 15 restricts the operation of the prohibition unit 14 to permit the automatic braking control. In this case, the driving assistance ECU 10 transmits a PCS brake command to the brake ECU 20 and a driving force limiting command to the engine ECU 30.

The driver's vehicle is decelerated at the PCS request deceleration Gpcs in a state in which the accelerator override cannot be performed. Thus, the driver's vehicle can securely be decelerated even if, for example, the driver performs an erroneous depression.

When the collision avoidance target is neither a pedestrian nor a bicycle (S11: No), that is, when the collision avoidance target is an automobile, the driving assistance ECU 10 advances the process to Step S13. In Step S13, the driving assistance ECU 10 reads a detection signal from the accelerator operation amount sensor, and determines whether the accelerator operation amount AP is equal to or larger than the first operation amount threshold AP1. For example, the accelerator operation amount AP is represented in units of "%". When the accelerator operation amount AP is smaller than the first operation amount threshold AP1 (S13: No), the process advances to Step S12. Thus, the automatic braking control is performed.

The first operation amount threshold AP1 is set to a value at which the accelerator operation amount AP can be regarded as being significantly large.

The driving assistance ECU 10 repeats this process, and terminates the switching control routine when collision between the driver's vehicle and the obstacle is avoided or when the driver's vehicle is stopped.

When the collision avoidance target is an automobile and when the accelerator operation amount AP increases to the first operation amount threshold AP1 or larger during the repetition of the switching control routine or when the accelerator operation amount AP is equal to or larger than the first operation amount threshold AP1 at a timing of satisfaction of the execution start condition for the switching control routine, the result of the determination is "Yes" in Step S13. In this case, the driving assistance ECU 10 advances the process to Step S14 to prohibit the automatic braking control. That is, the prohibition restriction unit 15 does not restrict the operation of the prohibition unit 14, and the prohibition unit 14 prohibits the automatic braking control. In this case, the engine 32 outputs the driver's request torque described above.

For example, when the collision avoidance target is an automobile and when the accelerator operation amount AP is equal to or larger than the first operation amount threshold AP1 at the timing of satisfaction of the execution start condition for the switching control routine, the driving assistance ECU 10 does not start the automatic braking control. Thus, the driving assistance ECU 10 transmits neither a PCS brake command to the brake ECU 20 nor a driving force limiting command to the engine ECU 30.

When the collision avoidance target is an automobile and when the accelerator operation amount AP increases to the first operation amount threshold AP1 or larger during the execution period of the switching control routine, the driving assistance ECU 10 terminates the automatic braking control at this time. Thus, the driving assistance ECU 10 stops transmitting the PCS brake command to the brake ECU 20 and the driving force limiting command to the engine ECU 30.

Thus, the driver's vehicle can perform the accelerator override. Accordingly, the driver can avoid collision while accelerating the driver's vehicle through an accelerator operation.

As described above, in the collision avoidance assistance apparatus of this embodiment, the automatic braking control is performed (the automatic braking control is permitted) irrespective of the accelerator operation amount when the collision avoidance target is "any one of a pedestrian and a bicycle". The automatic braking control is prohibited when the collision avoidance target is an automobile and when the accelerator operation amount is equal to or larger than the first operation amount threshold. Thus, the automatic braking control can be performed in an appropriate situation.

For example, in a situation in which the driver's vehicle is approaching "any one of a pedestrian and a bicycle", the driver does not generally depress the accelerator pedal forcefully. For example, in a case where the driver is perturbed about his/her late awareness of "any one of a pedestrian and a bicycle", the driver may erroneously depress the accelerator pedal forcefully though he/she tries to depress the brake pedal. According to this embodiment, the automatic braking control is performed and the accelerator override cannot be performed in this case. Thus, the collision avoidance can appropriately be assisted even if an erroneous depression is performed.

For example, in a case where the driver accelerates the driver's vehicle so as to pass a preceding vehicle (different automobile) traveling ahead of the driver's vehicle, determination may be made that the preceding vehicle is an obstacle because the driver's vehicle suddenly approaches the preceding vehicle in the process of passing the preceding vehicle. According to this embodiment, when the collision avoidance target is an automobile and when a forceful accelerator operation is performed, the automatic braking control is prohibited, and the accelerator override can be performed. Thus, the automatic braking control that is not desired by the driver is prohibited, and therefore the driver's vehicle can pass the preceding vehicle along a path desired by the driver. Further, a succeeding vehicle can be prevented from excessively approaching the driver's vehicle.

Modified Example 1

Figure 3:
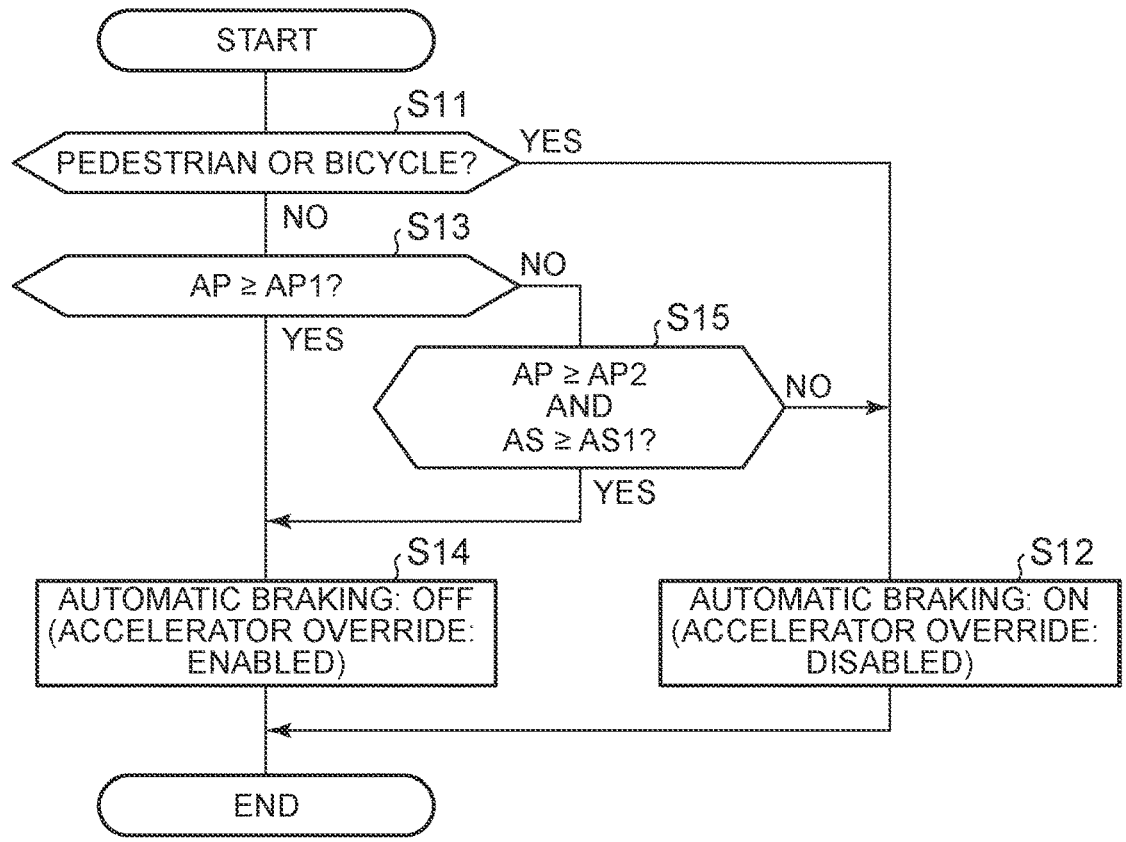
FIG. 3 is a flowchart illustrating Modified Example 1 of the automatic braking permission/prohibition switching control routine.

Next, Modified Example 1 of the switching control routine is described. FIG. 3 illustrates a switching control routine according to Modified Example 1. The switching control routine according to Modified Example 1 is provided by adding a determination process of Step S15 to the switching control routine of the embodiment (FIG. 2). The other processes are the same as those of the switching control routine of the embodiment. The same processes as those of the switching control routine of the embodiment are represented by common step numbers in the drawings to omit their description.

When determination is made in Step S13 that the accelerator operation amount AP is smaller than the first operation amount threshold AP1 (S13: No), the driving assistance ECU 10 advances the process to Step S15. In Step S15, the driving assistance ECU 10 determines whether the accelerator operation amount AP is equal to or larger than a second operation amount threshold AP2 and an accelerator operation speed AS is equal to or higher than an operation speed threshold AS1. The second operation amount threshold AP2 is smaller than the first operation amount threshold AP1, but is set to a value that the accelerator operation amount AP reaches only when an accelerator operation is regarded as a relatively forceful accelerator operation. The accelerator operation speed AS is an amount of change in the accelerator operation amount AP per unit time. The operation speed threshold AS1 is set to a value that the accelerator operation speed AS reaches only when an accelerator operation is regarded as a relatively quick accelerator operation.

Thus, the process of Step S15 is a process of determining whether an accelerator operation is performed in a relatively large operation amount and at a relatively high operation speed though the accelerator operation amount AP is smaller than the first operation amount threshold AP1.

When determination is made that the accelerator operation amount AP is equal to or larger than the second operation amount threshold AP2 and the accelerator operation speed AS is equal to or higher than the operation speed threshold AS1 (S15: Yes), the driving assistance ECU 10 advances the process to Step S14. When the result of the determination is negative (S15: No), the process advances to Step S12.

According to Modified Example 1, the accelerator operation condition for prohibition of the automatic braking control can be set more appropriately. Therefore, it is possible to reduce the occurrence of a case where the automatic braking control is performed due to an accelerator operation intended by the driver.

Modified Example 2

Figure 4:
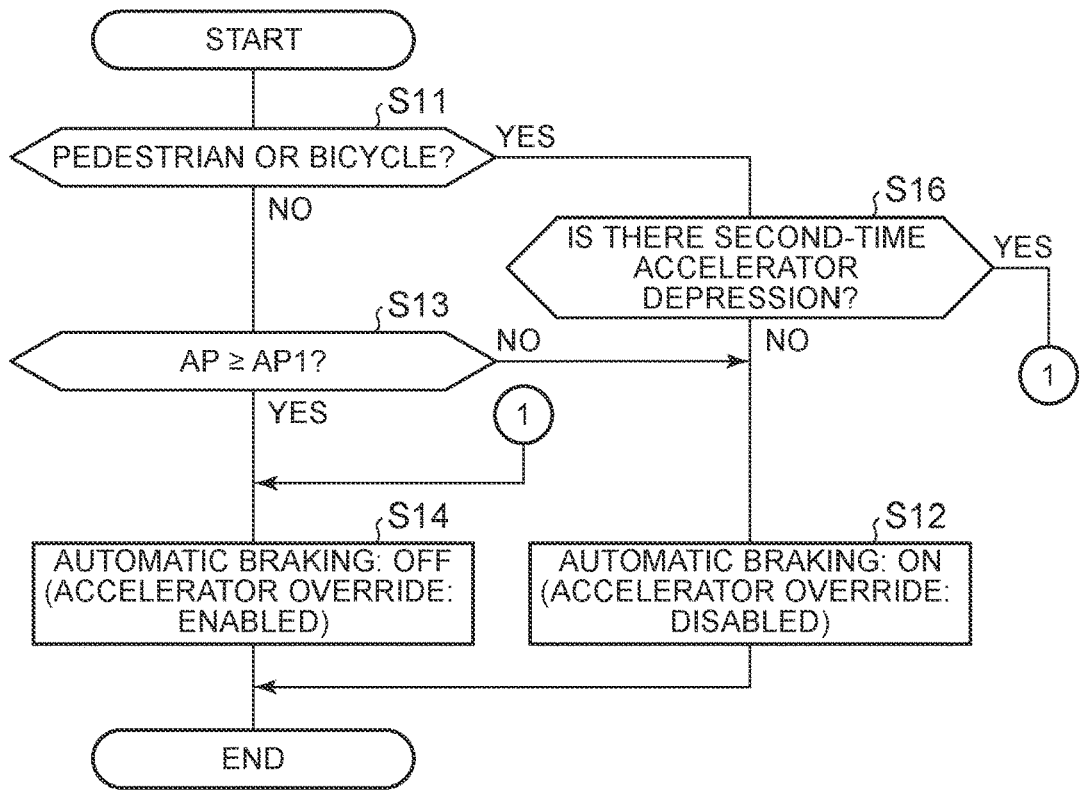
FIG. 4 is a flowchart illustrating Modified Example 2 of the automatic braking permission/prohibition switching control routine.

Next, Modified Example 2 of the switching control routine is described. FIG. 4 illustrates a switching control routine according to Modified Example 2. The switching control routine according to Modified Example 2 is provided by adding a determination process of Step S16 to the switching control routine of the embodiment (FIG. 2). The other processes are the same as those of the switching control routine of the embodiment. The same processes as those of the switching control routine of the embodiment are represented by common step numbers in the drawings to omit their description.

In the switching control routine of the embodiment, the automatic braking control is absolutely performed when the collision avoidance target is "any one of a pedestrian and a bicycle". In Modified Example 2, the automatic braking control is terminated when an accelerator operation intended by the driver is detected while the automatic braking control is performed.

When determination is made in Step S11 that the collision avoidance target is "any one of a pedestrian and a bicycle" (S11: Yes), the driving assistance ECU 10 advances the process to Step S16. In Step S16, the driving assistance ECU 10 determines whether a second-time depression of the accelerator pedal is performed. The second-time depression of the accelerator pedal is an operation of releasing a foot from the depressed accelerator pedal and then depressing the accelerator pedal again. This determination is made as to whether there is a history of the second-time depression of the accelerator pedal during the automatic braking control.

The driving assistance ECU 10 reads a detection signal from the accelerator operation amount sensor, and determines whether the second-time depression of the accelerator pedal is performed. For example, determination is made that the second-time depression of the accelerator pedal is performed when the accelerator operation amount decreases from a value at which the accelerator pedal is regarded as being depressed to a value at which the accelerator pedal is regarded as being undepressed, and then increases to the value at which the accelerator pedal is regarded as being depressed.

The second-time depression of the accelerator pedal can be presumed as an operation intended by the driver to accelerate the driver's vehicle. In this case, the accelerator override is preferably performed. When determination is made that the second-time depression of the accelerator pedal is performed during the automatic braking control (S16: Yes), the driving assistance ECU 10 advances the process to Step S14. Thus, the automatic braking control is terminated. Further, the accelerator override can be performed. Accordingly, the driver can avoid collision through his/her driving operation.

Figure 5:
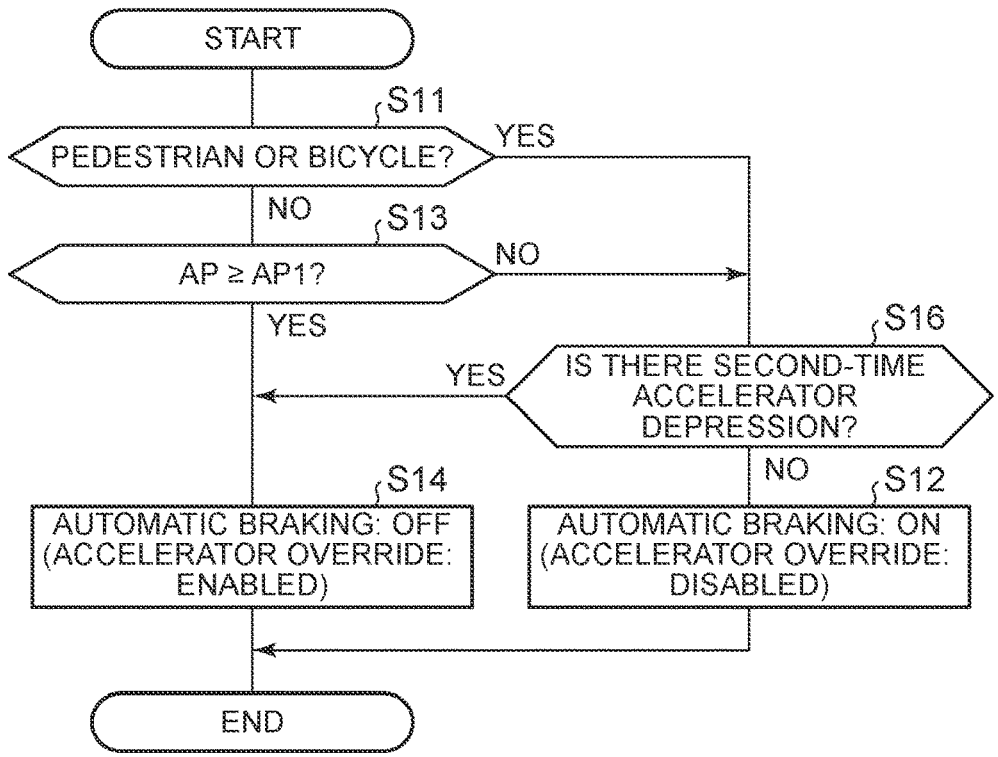
FIG. 5 is a flowchart illustrating Modified Example 3 of the automatic braking permission/prohibition switching control routine.

The determination process of Step S16 in Modified Example 2 is performed only when the collision avoidance target is "any one of a pedestrian and a bicycle". The determination process of Step S16 may be performed also when the collision avoidance target is an automobile as in a switching control routine of Modified Example 3 illustrated in FIG. 5. That is, the determination as to whether the second-time depression of the accelerator pedal is performed is made when the result of the determination is "No" in Step S11 and "No" in Step S13. When determination is made that the second-time depression of the accelerator pedal is performed (S16: Yes), the process advances to Step S14.

Although the collision avoidance assistance apparatus according to this embodiment is described above, the disclosure is not limited to the embodiment, but various modifications may be made without departing from the spirit of the disclosure.

For example, in this embodiment, the collision avoidance target is a pedestrian, a bicycle (bicycle that a person is riding), or an automobile, but is not limited to the three types.

For example, the switching control routine of Modified Example 1 and the switching control routine of Modified Example 2 (or Modified Example 3) may be combined. The determination in S13 of FIG. 3 may be made as to whether the accelerator operation speed AS is equal to or higher than the operation speed threshold AS1.

For example, the order of Step S11 and Step S13 in the switching control routine may be changed. That is, the determination process of Step S13 may be performed first, and the process of Step S11 may be performed when the result of the determination is "Yes" in Step S13.

What is claimed is:

1. A collision avoidance assistance apparatus comprising:
   a braking device configured to generate a braking force in a driver's vehicle in response to a braking operation of a driver;
   an obstacle detector configured to detect an obstacle around the driver's vehicle; and
   a controller configured to:
   (i) perform, when determination is made that the driver's vehicle has a strong possibility of colliding with the obstacle, automatic braking control for avoiding collision between the driver's vehicle and the obstacle by generating the braking force with the braking device without the braking operation of the driver;
   (ii) prohibit the automatic braking control when determination is made that an accelerator operation index value is equal to or larger than an operation threshold, the accelerator operation index value having a correlation with an accelerator operation of the driver;
   (iii) determine whether a type of the obstacle is a specific type set in advance; and
   (iv) avoid prohibiting the automatic braking control when determination is made that the type of the obstacle is the specific type.

2. The collision avoidance assistance apparatus according to claim 1, wherein the controller is configured to:
   (i) recognize at least a pedestrian, a bicycle, and an automobile as target obstacles for the automatic braking control; and
   (ii) determine that at least the pedestrian and the bicycle are obstacles of the specific type, and determine that at least the automobile is not the obstacle of the specific type.

3. The collision avoidance assistance apparatus according to claim 1, wherein
   the accelerator operation is an operation for an accelerator pedal of the driver's vehicle, and
   the controller is configured to:
   (i) determine whether a second-time depression of the accelerator pedal is performed during the automatic braking control; and
   (ii) terminate the automatic braking control when determination is made that the second-time depression of the accelerator pedal is performed during the automatic braking control.

4. The collision avoidance assistance apparatus according to claim 1, wherein
   the accelerator operation is an operation for an accelerator pedal of the driver's vehicle, and
   the controller is configured to:
   (i) acquire an accelerator pedal operation amount and an accelerator pedal operation speed of the driver as the accelerator operation index value; and (ii) determine that the accelerator operation index value is equal to or larger than the operation threshold when at least one of following conditions is satisfied:
  (a) a first condition that the accelerator pedal operation amount is equal to or larger than a first operation amount threshold; and
  (b) a second condition that the accelerator pedal operation amount is equal to or larger than a second operation amount threshold smaller than the first operation amount threshold and the accelerator pedal operation speed is equal to or higher than an operation speed threshold.

* * * * *

UNITED STATES PATENT AND TRADEMARK OFFICE
CERTIFICATE OF CORRECTION

PATENT NO. : 11,370,421 B2
APPLICATION NO. : 17/004481
DATED : June 28, 2022
INVENTOR(S) : Wataru Ike et al.

It is certified that error appears in the above-identified patent and that said Letters Patent is hereby corrected as shown below:

On the Title Page

Assignee item (73); Please delete "TOYOTA JIDOSHA KABUSHIKI KATSHA, Toyota (JP)" and insert -- TOYOTA JIDOSHA KABUSHIKI KAISHA, Toyota-shi, Aichi-ken (JP) --

Signed and Sealed this
Sixth Day of September, 2022

Katherine Kelly Vidal
*Director of the United States Patent and Trademark Office*